US009672291B2

(12) United States Patent
Aharony et al.

(10) Patent No.: US 9,672,291 B2
(45) Date of Patent: Jun. 6, 2017

(54) SUMMARIZING SOCIAL INTERACTIONS BETWEEN USERS

(71) Applicant: Google Inc., Mountain View, CA (US)

(72) Inventors: Nadav Aharony, Mountain View, CA (US); Alan Lee Gardner, III, Mountain View, CA (US); George Cody Sumter, Mountain View, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 14/622,794

(22) Filed: Feb. 13, 2015

(65) Prior Publication Data

US 2015/0234939 A1 Aug. 20, 2015

Related U.S. Application Data

(60) Provisional application No. 61/941,488, filed on Feb. 19, 2014.

(51) Int. Cl.
*G06F 7/00* (2006.01)
*G06F 17/30* (2006.01)

(52) U.S. Cl.
CPC .... *G06F 17/3087* (2013.01); *G06F 17/30867* (2013.01)

(58) Field of Classification Search
None
See application file for complete search history.

(56) References Cited

U.S. PATENT DOCUMENTS 8,208,943 B2  6/2012  Petersen et al.
8,571,999 B2  10/2013  Crawford (Continued)

FOREIGN PATENT DOCUMENTS

JP  2011-217128  10/2011

OTHER PUBLICATIONS

Kovach, Steve, "Flow to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

(Continued)

*Primary Examiner* — Tuan A Pham
(74) *Attorney, Agent, or Firm* — Patent Law Works LLP

(57) ABSTRACT

The disclosure includes a system and method for summarizing social interactions between users. The system includes a processor and a memory storing instructions that when executed cause the system to: receive a signal stream from at least one of a hardware sensor and a virtual detector, filter the signal stream and outputting filtered signal stream including data defining human-understandable actions, identify activities associated with a first user from the filtered signal stream, generate a summary of the first user's activities, determine that the first user is within proximity to a second user, determine a degree of separation between the first user and the second user in a social network, determine a time elapsed since a last interaction between the first user and the second user, classify the first user's relationship with the second user as being a first type of relationship, a second type of relationship or a third type of relationship, responsive to having the first type of relationship, generate a first summary for the first user that includes a notification that the second user is nearby, a last interaction with the second user and recent interactions with the second user, responsive to having the second type of relationship, generate a second summary for the first user that includes the notification that the second user is nearby, the last interaction with the second user and events that the first user and the second user share in common, and responsive to having the third type of relationship, generate a third summary for the first user that includes the notification that the second user is nearby and (Continued)

events that the first user and the second user share in common.

16 Claims, 9 Drawing Sheets

(56) References Cited

U.S. PATENT DOCUMENTS

| | | |
|---|---|---|
| 2007/0015518 A1 | 1/2007 | Winter et al. |
| 2007/0030824 A1 | 2/2007 | Ribaudo et al. |
| 2010/0299615 A1* | 11/2010 | Miluzzo ................ H04W 4/02 715/752 |
| 2010/0311395 A1 | 12/2010 | Zheng |
| 2013/0046770 A1 | 2/2013 | Tseng |
| 2013/0073378 A1 | 3/2013 | Naveh et al. |
| 2013/0073970 A1* | 3/2013 | Piantino ................ G06Q 50/01 715/738 |
| 2013/0073976 A1* | 3/2013 | McDonald ............. G06Q 10/00 715/739 |
| 2014/0033074 A1* | 1/2014 | Thibaux ............ G06F 17/30867 715/753 |
| 2014/0040368 A1* | 2/2014 | Janssens ............... H04L 67/306 709/204 |

OTHER PUBLICATIONS

International Search Report & Written Opinion for PCT/US2015/016208, mailed on May 26, 2015, 12 pages.

* cited by examiner

SUMMARIZING SOCIAL INTERACTIONS BETWEEN USERS

CROSS REFERENCE TO RELATED APPLICATIONS

The present application claims priority, under 35 U.S.C. §119, of U.S. Provisional Patent Application No. 61/941,488, filed Feb. 19, 2014, and entitled "Summarizing Social Interactions Between Users," which is incorporated by reference in its entirety.

BACKGROUND

The specification relates to managing user activities. More specifically, the specification relates to analyzing user activities and summarizing social interactions between users.

Social settings can be very nerve wracking, especially when a person forgets how they know another person at the party. Current technology exists to search for a person's name to see what has been posted on the Internet; however, this presumes that the person's name is known. Even if the person's name is known, it can be hard to gather all the pertinent facts in the short time before speaking with the person.

SUMMARY

According to one innovative aspect of the subject matter described in this disclosure, a system for summarizing social interactions between users includes a processor and a memory storing instructions that, when executed, cause the system to: receive a signal stream from at least one of a hardware sensor and a virtual detector; filter the signal stream and outputting filtered signal stream including data defining human-understandable actions; identify activities associated with a first user from the filtered signal stream; generate a summary of the first user's activities; determine that the first user is within proximity to a second user; determine a degree of separation between the first user and the second user in a social network; determine a time elapsed since a last interaction between the first user and the second user; classify the first user's relationship with the second user as being a first type of relationship, a second type of relationship or a third type of relationship; responsive to having the first type of relationship, generate a first summary for the first user that includes a notification that the second user is nearby, a last interaction with the second user and recent interactions with the second user; responsive to having the second type of relationship, generate a second summary for the first user that includes the notification that the second user is nearby, the last interaction with the second user and events that the first user and the second user share in common; and responsive to having the third type of relationship, generate a third summary for the first user that includes the notification that the second user is nearby and events that the first user and the second user share in common.

In general, another innovative aspect of the subject matter described in this disclosure may be embodied in methods that include: receiving a signal stream from at least one of a hardware sensor and a virtual detector; filtering the signal stream and outputting filtered signal stream including data defining human-understandable actions; identifying activities associated with a first user from the filtered signal stream; generating a summary of the first user's activities; determining that the first user is within proximity to a second user; determining a degree of separation between the first user and the second user in a social network; determining a time elapsed since a last interaction between the first user and the second user; classifying the first user's relationship with the second user as being a first type of relationship, a second type of relationship or a third type of relationship; responsive to having the first type of relationship, generating a first summary for the first user that includes a notification that the second user is nearby, a last interaction with the second user and recent interactions with the second user; responsive to having the second type of relationship, generating a second summary for the first user that includes the notification that the second user is nearby, the last interaction with the second user and events that the first user and the second user share in common; and responsive to having the third type of relationship, generating a third summary for the first user that includes the notification that the second user is nearby and events that the first user and the second user share in common.

Other aspects include corresponding methods, systems, apparatus, and computer program products for these and other innovative aspects.

These and other embodiments may each optionally include one or more of the following features. For instance, the operations include: determining closeness between the first user and the second user based on at least one of the degree of separation and the time elapsed since the last interaction, and wherein classifying the first user's relationship with the second user is based on the closeness; determining what information of the summary to provide to the first user based on privacy settings; and determining that the first user is within proximity to the second user based at least in part on data received from at least one of the hardware sensor and the virtual detector. For instance, the features include: the first summary including action items that the first user owes the second user; the second summary including important events that occurred to the first user that the second user might be interested in hearing about; the second summary including a name of a mutual connection and an event that the mutual connection attended; the second summary including a recent post on a social network that was created by the second user; and the third type of relationship being between a first user that has not met the second user in person.

The disclosure may be particularly advantageous in improving social interactions among people because a first user can get different summaries of user activities based upon different connections with other users that remind the first user about who the other users are, where they met last time, which topics they might discuss, etc.

BRIEF DESCRIPTION OF THE DRAWINGS

The specification is illustrated by way of example, and not by way of limitation, in the figures of the accompanying drawings in which like reference numerals are used to refer to similar elements.

DETAILED DESCRIPTION

The specification discloses a system and method for summarizing social interactions between users. The summary application receives a signal stream from at least one of a hardware sensor and a virtual detector. The summary application filters the signal stream and outputs a filtered signal stream including data for defining one or more human-understandable actions. The summary application identifies one or more activities associated with a first user from the filtered signal stream. The summary application generates a summary of the first user's activities. For example, the first user attended a conference, posted pictures of an important event, and checked-in at a restaurant. The summary application determines that the first user is within proximity to a second user and determines a degree of separation between the first user and the second user in a social network. For example, if the first user follows the second user they have a first degree relationship. The summary application determines a time elapsed since a last interaction between a first user and a second user. For example, if more than a month has passed since they last interacted, they are not close friends.

The summary application classifies the first user's relationship with the second user as being a first type of relationship, a second type of relationship or a third type of relationship. Responsive to having the first type of relationship, the summary application generates a first summary for the first user that includes a notification that the second user is nearby, a last interaction with the second user and recent interactions with the second user. The first type of relationship includes, for example, friendship. Responsive to having the second type of relationship, the summary application generates a second summary for the first user that includes the notification that the second user is nearby, the last interaction with the second user and events that the first user and the second user share in common. This applies when the users are acquaintances. For example, the first and second users have mutual friends and both lived in Cambridge at one time. In some embodiments, the summary application also generates a summary of all the important life events that occurred to the first user since he last spoke with the second user. For example, the first user started a new job and had a baby. Responsive to having the third type of relationship, the summary application generates a third summary for the first user that includes the notification that the second user is nearby and events that the first user and the second user share in common. For example, the first user and second user both attended the same conference last week. This is for users that do not know each other very well and gives them things to discuss.

Figure 1:
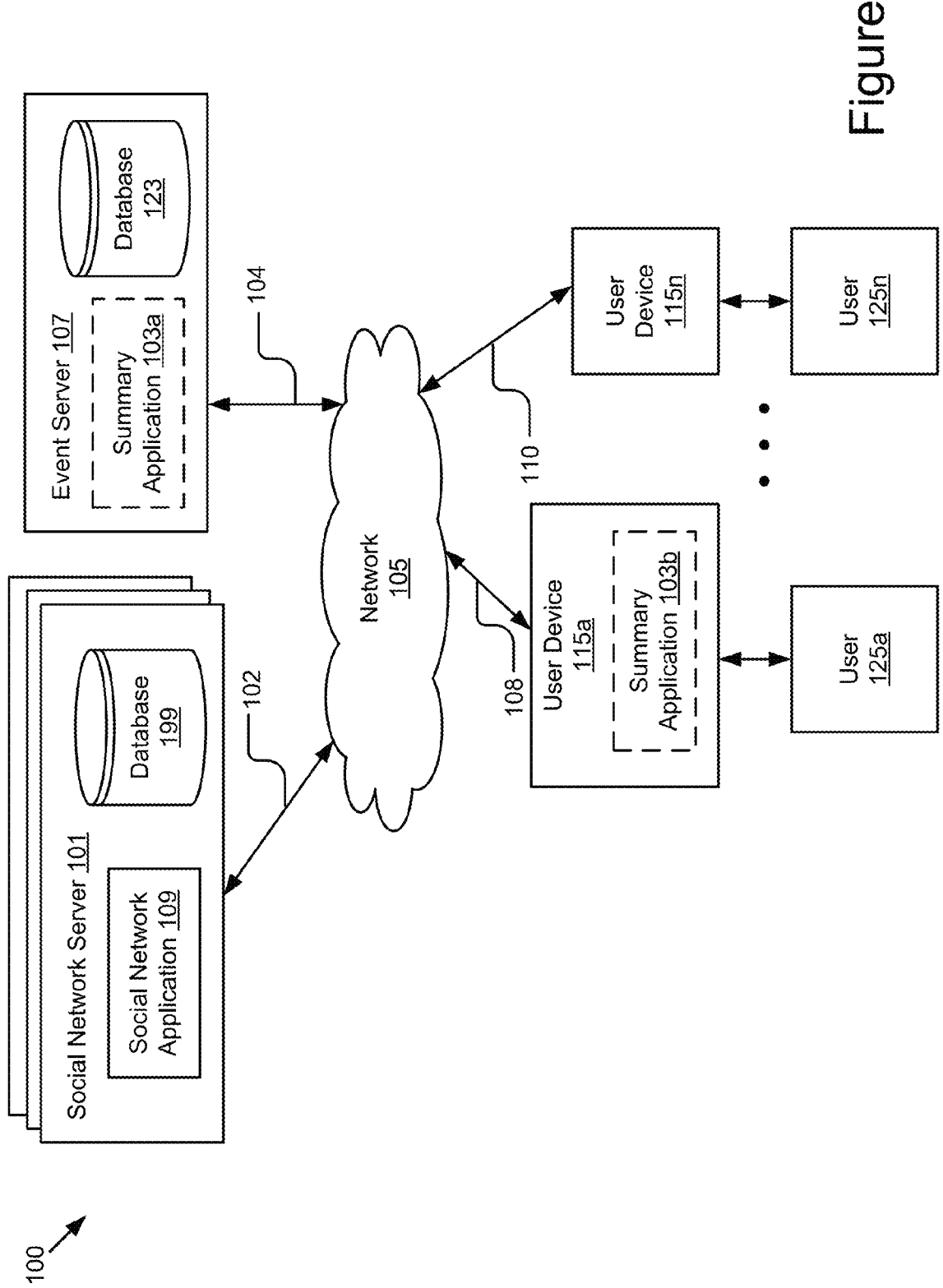
FIG. 1 is a block diagram illustrating an example of a system for generating a summary of a user.

FIG. 1 illustrates a block diagram of a system 100 for summarizing social interactions between users. The illustrated description of the system 100 includes user devices 115a . . . 115n that are accessed by users 125a . . . 125n, one or more social network servers 101 and an event server 107. In the illustrated embodiment, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 can be a conventional type network, wired or wireless, and may have any number of configurations, for example, a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of a telecommunications network for sending data in a variety of different communication protocols. In other embodiments, the network 105 includes Bluetooth® communication networks or a cellular communications network for sending and receiving data, for example, via SMS/MMS, hypertext transfer protocol (HTTP), direct data connection, WAP, e-mail, etc. While only one network 105 is illustrated, in practice one or more networks 105 may be coupled to the above mentioned entities.

The social network server 101 can be a hardware server that includes a processor, a memory and network communication capabilities. The social network server 101 is communicatively coupled to the network 105 via signal line 102. In some embodiments, the social network server 101 sends and receives data to and from one or more of the user devices 115a, 115n and the event server 107 via the network 105. The social network server 101 includes a social network application 109 and a database 199.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. The social network application 109 in the social network server 101 manages the social network by handling registration of users, publication of content (e.g., posts, comments, photos, links, check-ins, etc.), hosting multi-user communication sessions, managing of groups, managing different sharing levels, updating the social graph, etc. The social network application 109 registers a user by receiving information such as a username and password and generates a user profile that is associated with the user and stored as part of the social graph. In some embodiments, the user profile includes additional information about the user including interests (e.g., soccer, reading, food, subscriptions, etc.), activities (e.g., search history, indications of approval, posts, comments, multi-user communication sessions, etc.), demographics (e.g., age, ethnicity, location, etc.), and profile rating and reputation (e.g., intelligence rating, humor rating, etc.). The database 199 in the social network server 101 stores social network data associated with the users. For example, the database 199 stores social network data describing one or more of user profiles, posts, comments, videos, audio files, images, sharings, acknowledgements, etc., published on a social network. The system 100 may include multiple social network servers 101 that include traditional social network servers, email servers, micro-blog servers, blog servers, forum servers, message servers, etc.

Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating, and others may be of general interest or a specific focus.

The user devices 115a, 115n in FIG. 1 are used by way of example. Although only two user devices 115 are illustrated, the disclosure applies to a system architecture having any number of user devices 115 available to any number of users 125. In the illustrated implementation, the user 125a interacts with the user device 115a. In some embodiments, the summary application 103a can be stored on the user device 115a which is communicatively coupled to the network 105 via signal line 108. The user 125n interacts with the user device 115n. The user device 115n is communicatively coupled to the network 105 via signal line 110.

In some embodiments, the user device 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto, or any other electronic device capable of accessing the network 105, etc.

In some embodiments, the user device 115 can include a mobile device that is worn by the user 125. For example, the user device 115 is included as part of a clip (e.g., a wristband), as part of a jewelry piece or as part of a pair of glasses. In another example, the user device 115 can be a smart watch. The user 125 can view notifications from the summary application 103 on a display of the device worn by the user 125. For example, the user 125 can view the notifications on a display of a smart watch or a smart wristband. In another example, the user 125 can view the notifications on an optical head-mounted display of a pair of glasses. The user 125 may also configure what types of notifications to be displayed on the device worn by the user 125. For example, the user 125 may configure the wearable device to flash a LED light for five seconds if a friend's mobile device is detected in proximity to the user 125.

In some embodiments, the summary application 103 can be split into some components that are stored on the user device 115a and some components that are stored on the event server 107. For example, the summary application 103a on the user device 115a acts in part as a thin-client application and sends an event stream including one or more events associated with a user to the summary application 103b on the event server 107. The summary application 103b on the event server 107 augments the event stream by including new events and sends back the updated event stream to the summary application 103a on the user device 115a for presenting the event stream to the user 125a.

In some embodiments, the summary application 103b can be stored on an event server 107, which is connected to the network 105 via signal line 104. In some embodiments, the event server 107 can be a hardware server that includes a processor, a memory and network communication capabilities. The event server 107 sends and receives data to and from other entities of the system 100 via the network 105. While FIG. 1 illustrates one event server 107, the system 100 may include one or more event servers 107.

The summary application 103 can be software including routines for generating a summary of user activities. In some embodiments, the summary application 103 can be implemented using hardware including a field-programmable gate array (FPGA) or an application-specific integrated circuit (ASIC). In some other embodiments, the summary application 103 can be implemented using a combination of hardware and software. In some embodiments, the summary application 103 may be stored in a combination of the devices and servers, or in one of the devices or servers. The summary application 103 is described in further detail below with reference to FIG. 2.

The summary application 103 identifies activities associated with users and generates a summary of the user activities for a user. In some embodiments, the summary application 103 determines that a first user is within proximity of a second user, generates a summary based on the relationship between the first and second users and provides the first user with the summary. The summary includes a notification that the second user is nearby, a last time the first user interacted with the second user and information about the at least one of the first user and the second user. For example, if Joe came to Salt Lake City where Amy lives after they last met with each other in their mutual friend Mary's house three months ago, the summary application 103 determines that Joe is an acquaintance of Amy (because they have not connected with each other for the past three months) and generates a summary for Amy to notify that Joe is nearby and that their last interaction was in Mary's house three months ago. The summary also includes a picture of Joe looking at the Seagull Monument in Salt Lake City, a picture of Amy's new house and a picture of Amy having lunch with Mary. The summary reminds Amy of Joe and provides topics that they can discuss (e.g., the Seagull Monument in Salt Lake City, Amy's new house or their mutual friend Mary). As a result, the connection between Amy and Joe might be improved.

The summary application 103 generates different summaries for a user based on different relationships between the user and other users. For example, the summary application 103 determines that Ryan is a close friend of Richard since they talk on a social network every week. When Ryan is attending a conference in the city where Richard lives, the summary application 103 detects Ryan's location and generates a summary to notify Richard that Ryan is nearby and remind Richard that he told Ryan that they will visit a neighboring national park together when Ryan comes to the city. In the meantime, if Oscar is also attending the conference in the city and he is not a close friend of Richard, e.g., Oscar and Richard have no personal connections except that they went to the same high school, the summary application 103 may generate a different summary that includes the information "both of you attended Murray High School" for Richard responsive to Oscar attending the conference in the city.

Figure 2:
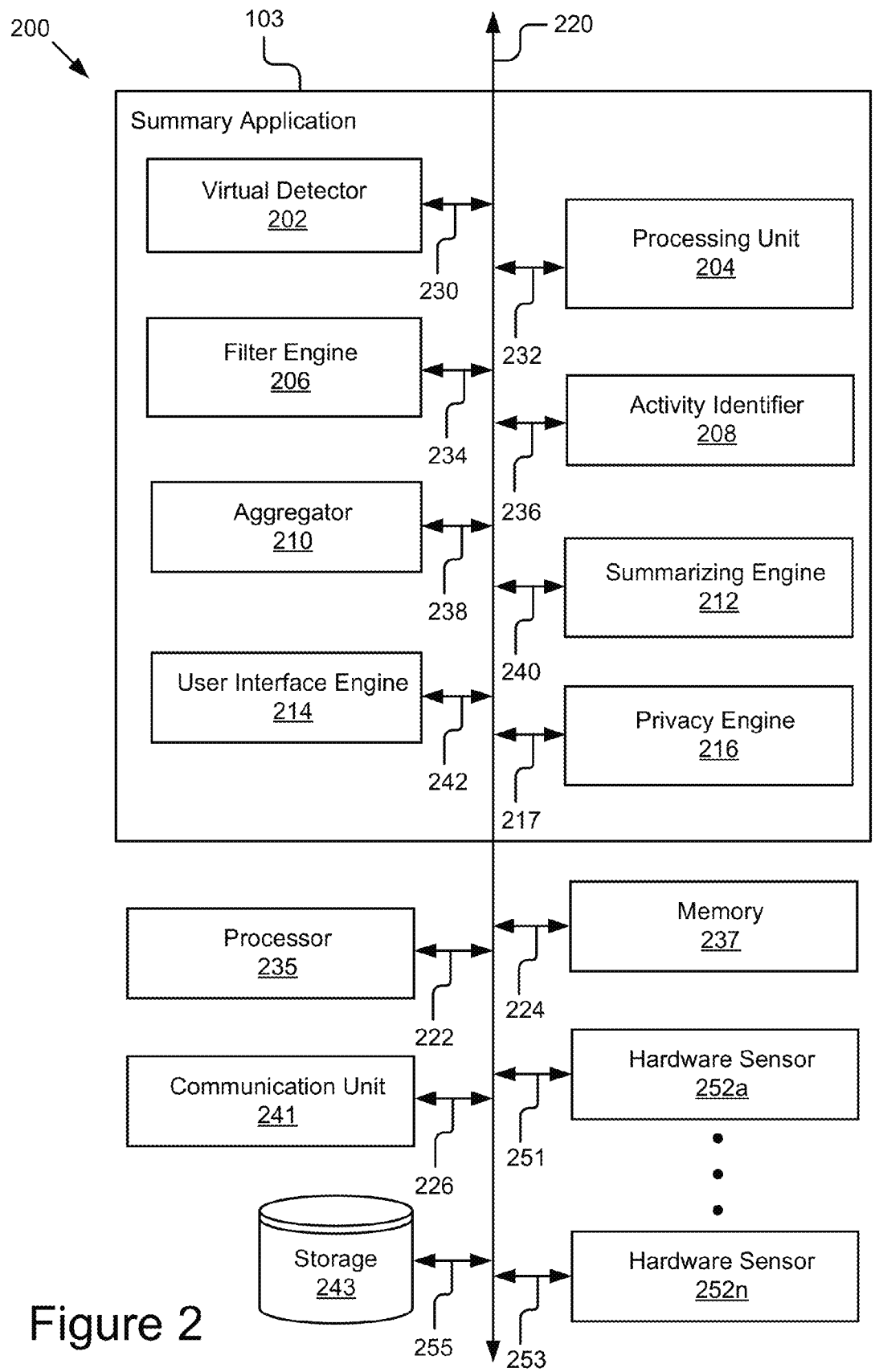
FIG. 2 is a block diagram illustrating an example of a summary application.

Referring now to FIG. 2, an example of the summary application 103 is shown in more detail. FIG. 2 is a block diagram of a computing device 200 that includes the summary application 103, a processor 235, a memory 237, a communication unit 241, a storage device 243, and one or more hardware sensors 252a . . . 252n according to some examples. The components of the computing device 200 are communicatively coupled by a bus 220. In some embodiments, the computing device 200 can be one of a user device 115 and an event server 107.

The processor 235 includes an arithmetic logic unit, a microprocessor, a general-purpose controller, or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors 235 may be included. The processing capability may be limited to supporting the display of images and the capture and transmission of images. The processing capability might be enough to perform more complex tasks, including various types of feature extraction and sampling. In practice, other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory, or some other memory device known in the art. In some embodiments, the memory 237 also includes a non-volatile memory or similar permanent storage device and media for example a hard disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115, the event server 107 and the social network server 101 depending upon where the summary application 103 is stored. The communication unit 241 is coupled to the bus 220 via signal line 242. In some embodiments, the communication unit 241 includes a port for direct physical connection to the network 105 or to another communication channel. For example, the communication unit 241 includes a USB, SD, CAT-5 or similar port for wired communication with the user device 115. In other embodiments, the communication unit 241 includes a wireless transceiver for exchanging data with the user device 115 or any other communication channel using one or more wireless communication methods, such as IEEE 802.11, IEEE 802.16, Bluetooth or another suitable wireless communication method.

In some embodiments, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail, or another suitable type of electronic communication. In other embodiments, the communication unit 241 includes a wired port and a wireless transceiver. The communication unit 241 also provides other conventional connections to the network for distribution of files and/or media objects using standard network protocols such as TCP/IP, HTTP, HTTPS, and SMTP as will be understood to those skilled in the art.

The storage device 243 can be a non-transitory memory that temporarily stores data used by the summary application 103, for example, a cache. The storage device 243 may be a dynamic random access memory (DRAM) device, a static random access memory (SRAM) device, flash memory, or some other memory device known in the art. In some embodiments, the storage device 243 also includes a non-volatile memory or similar permanent storage device and media such as a hard disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 243 is communicatively coupled by the bus 220 for communication with the other components of the computing device 200 via signal line 240. Although only one storage device 243 is shown in FIG. 2A, multiple storage devices 243 may be included. In other embodiments, the storage device 243 may not be included in the user device 115 and can be communicatively coupled to the user device 115 via the network 105.

In the illustrated embodiment, the storage device 243 stores one or more of raw data, signal streams, activities performed by one or more users and analytics data associated with the activities. The data stored in the storage device 243 is described below in more detail. In some embodiments, the storage device 243 may store other data for providing the functionality described herein.

The hardware sensors 252a . . . 252n are physical sensors for detecting data. Example hardware sensors 252 include, but are not limited to, an infrared sensor, an accelerometer, a pedometer, a global positioning system (GPS) sensor, a Bluetooth sensor, a power detector, a battery detector, a camera, a light detection and ranging (LIDAR) sensor, a motion sensor, a capacitive sensor, a thermostat, and a microphone, etc. Other example hardware sensors 252 are possible. The hardware sensor 252a is communicatively coupled to the bus 220 via signal line 251, and the hardware sensor 252n is communicatively coupled to the bus 220 via signal line 253.

In some embodiments, the one or more hardware sensors 252 generate sensor data and send the sensor data to a processing unit 204 of the summary application 103. The sensor data generated by the one or more hardware sensors 252 are referred to as hardware raw data. Example hardware raw data includes, but is not limited to, data describing a number of steps from a pedometer, data describing a geographic location (e.g., a latitude, a longitude and an elevation of a location) and a velocity from a GPS sensor, data describing a presence of other devices in close proximity to the user device 115 from a Bluetooth sensor, data describing a movement from an accelerometer (e.g., the user device 115 is being held in a certain orientation while watching a video, playing a video game, etc.), data describing brightness in an environment from a light detector, data describing detecting ambient sounds from a microphone, data describing detecting wireless access points from wireless transceivers, etc. Other example hardware raw data is possible. In some embodiments, the one or more hardware sensors 252 generate the hardware raw data with permission from the user and store the hardware raw data in the storage device 243.

In the illustrated implementation shown in FIG. 2, the summary application 103 includes a virtual detector 202, a processing unit 204, a filter engine 206, an activity identifier 208, an aggregator 210, a summarizing engine 212, a user interface engine 214, and a privacy engine 216.

The virtual detector 202 can be software including routines for generating raw data. In some embodiments, the virtual detector 202 can be a set of instructions executable by the processor 235 to provide the functionality described below for generating raw data. In some embodiments, the virtual detector 202 can be stored in the memory 237 of the computing device 200 and can be accessible and executable by the processor 235. The virtual detector 202 may be adapted for cooperation and communication with the processor 235 and other components of the computing device 200 via signal line 230.

In some embodiments, the one or more hardware sensors 252 generate hardware raw data, and send the hardware raw data to the processing unit 204. The virtual detector 202 generates other raw data that is not related to hardware sensors 252, and sends the other raw data to the processing unit 204. The other raw data generated by the virtual detector 202 is referred to as virtual raw data. In some embodiments, the virtual detector 202 generates the virtual raw data with permission from the user.

Example virtual raw data includes, but is not limited to, software raw data related to software stored on the user device 115, mobile network information related to the user device's 115 mobile network, file status on the user device 115, data describing interactions between the user and the user device 115 (e.g., the user turning up or turning down volume, brightness, contrast, etc. on the user device 115, the user zooming in or zooming out of content displayed on the user device 115, the user scrolling down on a touch screen or typing in a user interface, the user making a phone call using the user device 115, etc.), data describing user interactions on a social network (e.g., the user viewing a social stream on a social network; the user publishing a post, sharing a web page, posting a comment, viewing a video, listening to an audio file, playing an online game, submitting a survey, adding users as his or her connections, etc., on the social network), the user's online search history, the user's browsing history and the user's communication history (e.g., text messages, emails, etc.). In some embodiments, the virtual raw data is retrieved with permission from the user, etc. Other example virtual raw data is possible. In some embodiments, the virtual raw data includes metadata associated with the user device 115.

Example software raw data related to software stored on the user device 115 includes, but is not limited to, operating system information related to the user device 115 (e.g., the user updating the operating system, switching the operating system, etc.), applications stored on the user device 115 (e.g., applications for fitness tracking, counting calories, mobile payment, reading books, listening to music, etc.) and application usage information on the user device 115 (e.g., the user entering his or her gym routine into a fitness tracking application, opening a song playlist in a media library, closing an instant messaging application, deleting an unused application, updating an existing application, installing a new application, configuring an application setting, etc.). Other example software raw data is possible. In some embodiments, the virtual detector 202 stores the virtual raw data in the storage device 243.

The processing unit 204 can be software including routines for receiving signal streams from the virtual detector 202 and/or one or more hardware sensors 252. In some embodiments, the processing unit 204 can be a set of instructions executable by the processor 235 to provide the functionality described below for receiving signal streams from the virtual detector 202 and/or one or more hardware sensors 252. In some embodiments, the processing unit 204 can be stored in the memory 237 of the computing device 200 and can be accessible and executable by the processor 235. The processing unit 204 may be adapted for cooperation and communication with the processor 235 and other components of the computing device 200 via signal line 232.

In some embodiments, the processing unit 204 receives a signal stream from the virtual detector 202, where the signal stream includes virtual raw data generated by the virtual detector 202. In other embodiments, the processing unit 204 receives a signal stream from one or more hardware sensors 252, where the signal stream includes hardware raw data generated by the one or more hardware sensors 252. In some other embodiments, the processing unit 204 receives a stream of virtual raw data from the virtual detector 202 and a stream of hardware raw data from the one or more hardware sensors 252, where the stream of virtual raw data and the stream of hardware raw data together form a consolidated signal stream. The processing unit 204 sends the signal stream to the filter engine 206. In some embodiments, the processing unit 204 stores the signal stream in the storage 243.

In some embodiments, the processing unit 204 validates the data in the signal stream for its usefulness. In some embodiments, the processing unit 204 saves a data block from the signal stream that indicates a change in state as when compared to a previous data block. For example, at a first timestamp, the processing unit 204 may receive a first set of location data from a GPS sensor indicating a user has just arrived at a coffee shop after coming out of a subway station, and the processing unit 204 may save the first set of location data. At a second timestamp, if the processing unit 204 receives, from the GPS sensor, a second set of location data which is identical to the first set of location data, indicating the user is at the same location as the first timestamp, the processing unit 204 does not save the second set of location data. However, at a third timestamp, if the processing unit 204 receives, from the GPS sensor, a third set of location data which is different from the second set of location data, indicating the user has left the coffee shop and is now in the office, the processing unit 204 saves the third set of location data. At the first timestamp, the user is in transit since the user just arrived at the coffee shop after coming out of a subway station; at the second timestamp, the user is stationary since the user is still at the coffee shop; at the third timestamp, the user is in transit again since the user has left the coffee shop and is now in the office. The processing unit 204 saves data related to the transit moments and ignores data related to the stationary moments.

In some examples, the processing unit 204 saves the data from the signal stream that indicate a change in a frequency of steps (e.g., data from accelerometer), a change of velocity (e.g., data from GPS sensor), a change of location (e.g., data from a GPS sensor, a wireless transceiver, etc.), a change in application usage (e.g., an application being opened, used, closed, updated, installed, etc.), a change in actions performed on a social network (e.g., a user logging in, logging out, uploading a photograph, accepting invites, posting a comment, indicating an acknowledgement, adding other users as connections, etc.), a change related to detecting a presence of other user devices 115n in close proximity of the user device 115a or other changes in state.

The filter engine 206 can be software including routines for filtering signal streams. In some embodiments, the filter engine 206 can be a set of instructions executable by the processor 235 to provide the functionality described below for filtering signal streams. In some embodiments, the filter engine 206 can be stored in the memory 237 of the computing device 200 and can be accessible and executable by the processor 235. The filter engine 206 may be adapted for cooperation and communication with the processor 235 and other components of the computing device 200 via signal line 234.

In some embodiments, the filter engine 206 filters the signal stream to define one or more human-understandable actions. For example, the filter engine 206 filters the signal stream to retrieve data describing a number of steps from the accelerometer of the user device 115 and outputs a filtered signal stream including step data. In another example, the filter engine 206 filters the signal stream to retrieve sequence of location and velocity data from a GPS sensor of the user device 115 and outputs a filtered signal stream including location data. In yet another example, the filter engine 206 filters the signal stream to retrieve data describing detection of a mobile device in close proximity to the user device 115 and outputs a filtered signal stream including detection data. Such a filtered signal stream includes hashed identifiers (i.e., hashed using phone number, email, or social network profile identifiers, etc.) associated with the mobile device in close proximity of the user device 115.

In some embodiments, the filter engine 206 filters the signal stream to combine different types of data in a filtered signal stream to define one or more human understandable actions. For example, the filter engine 206 outputs a filtered signal stream that combines one or more of the following data including: (1) location and velocity data from a GPS sensor, and (2) detection data indicating presence of an automobile (e.g., Bluetooth enabled) and a mobile in close proximity, etc. to indicate travelling together with another user. In another example, the filter engine 206 outputs a filtered signal stream that combines one or more of the following data including: (1) ambient sound data from a microphone, (2) location data from a GPS sensor or Wi-Fi access point, and (3) uploading one or more pictures with GPS tags matching the location data to the social network, etc. to indicate a social gathering. In yet another example, the filter engine 206 outputs a filtered signal stream that combines one or more of the following data including: (1) motion data from an accelerometer, (2) ambient illumination data from a light sensor, (3) energy usage data from a power detector on the user device 115, and (4) application usage data from an application manager in the user device 115, etc. to indicate sleeping or active day time activity.

In some embodiments, the filter engine 206 filters the signal stream to identify changes in one or more human understandable actions. For example, assume a Bluetooth sensor on a user's mobile device is detecting a presence of a number of mobile devices in close proximity of the user every five minutes from 1:00 PM to 1:30 PM. The filter engine 206 filters the data generated by the Bluetooth sensor and outputs a filtered signal stream that includes (1) data indicating detection of a first mobile device and a second mobile device in proximity of the user at 1:00 PM, and (2) data indicating detection that the second mobile device is no longer in proximity of the user at 1:25 PM. In another example, assume a GPS sensor on a user's mobile device updates the location of the user every 2 minutes from 8:00 AM to 8:30 AM. The filter engine 206 filters the data generated by the GPS sensor and outputs a filtered signal stream that includes (1) a first set of location and timestamp describing that the user arrived at a coffee shop at 8:04 AM and (2) a second set of location and timestamp data describing that the user left the coffee shop at 8:30 AM. Other sets of location and timestamp data received from the GPS sensor between 8:00 AM and 8:30 AM are not included in the filtered signal stream because they are identical or too similar.

In some embodiments, the filtered signal stream includes data describing appearance and disappearance of another user device 115. For example, assume a Bluetooth sensor detects a presence of a friend's mobile device and generates data describing the presence of the friend's mobile device every five minutes from 1:00 PM to 1:30 PM. The filter engine 206 filters the data generated by the Bluetooth sensor, and outputs a filtered signal stream that only includes (1) data indicating an appearance of the friend's mobile device at 1:00 PM and (2) data indicating the friend's mobile device was last detected at 1:30 PM. In some other embodiments, the filtered signal stream includes data indicating a change of a frequency of steps, a change of velocity, a change of application usage (e.g., an application being open or being closed), a change of actions on a social network (e.g., a user logging in or exiting from a social network account) or other changes in actions In some embodiments, the filter engine 206 filters the signal stream to include data from a Bluetooth sensor associated with a first user device 115 of a first user, where the data can be used to determine a presence of a second user device 115 that also has a Bluetooth sensor. For example, if the first user device 115 and the second device 115 are in proximity, the first user device 115's Bluetooth sensor generates data indicating a presence of the second user device 115. In some examples, the data indicating presence of the second user device 115 can also indicate a presence of a second user associated with the second user device 115 (e.g., the first user and the second user are in proximity). For example, if the second user device 115 is a mobile device, the presence of the mobile device may indicate the presence of the second user. In some embodiments, the filter engine 206 filters the signal stream to additionally include received signal strength indicator (RSSI) data from the Bluetooth sensor for increased granularity.

The detection using the Bluetooth sensors is easy to implement and can be turned on automatically with the user's permission. If the two user devices 115 are within the detection radius of the Bluetooth sensors, the detection yields accurate results. However, some devices may not be able to be discovered by Bluetooth sensors. For example, an old device may not be detected by a user device 115 having Bluetooth sensors.

In some embodiments, the filter engine 206 filters a first signal stream, and outputs a first filtered signal stream that includes a first set of data from a first Bluetooth sensor associated with a first user device 115 of a first user. The first set of data indicates the first user device 115 detects a presence of a third device at a first timestamp. Also, the filter engine 206 filters a second signal stream, and outputs a second filtered signal stream that includes a second set of data from a second Bluetooth sensor associated with a second user device 115 of a second user. The second set of data indicates the second user device 115 detects a presence of the third device at a second timestamp. If the time difference between the first timestamp and the second timestamp is within a predetermined threshold (e.g., five seconds), the first set of data and the second set of data can be used by the activity identifier 208 to determine that the first user device 115 and the second user device 115 are in proximity since both of the two user devices 115 detect the third device within a short time period. The activity identifier 208 is described below in more detail.

For example, assume the third device is a vehicle. If the vehicle is detected almost simultaneously by two mobile devices of two users, the two users are very likely to be in the same vehicle. The first and second filtered signal streams may additionally include velocity data from GPS sensors respectively. If the velocity data indicates the two users are moving, the activity identifier 208 can estimate the two users are travelling in the same vehicle. In another example, assume the third device is a device at home with a Bluetooth sensor (e.g., a Bluetooth-enabled personal computer). If the device at home is respectively detected by two mobile devices of two users within a predetermined time window (e.g., within 10 seconds), the activity identifier 208 can estimate that the two users are at home. In some examples, the activity identifier 208 estimates two users as being together if the location data from GPS sensors indicates the two users' geo-locations are the same.

In some embodiments, the filter engine 206 filters the signal streams to additionally include received signal strength indicator (RSSI) data for increased granularity. In some embodiments, the filter engine 206 may poll for specific known devices by filtering available devices based on a social graph of a user and/or the user's location. For example, the filter engine 206 identifies a group of devices used by the user's friends. In another example, the filter engine 206 identifies a group of devices at the same location as the user. In yet another example, the filter engine 206 identifies a group of devices that are used by the user's friends and at the same location as the user.

In some embodiments, the filter engine 206 provides the filtered signal stream to applications stored on the user device 115. For example, the step data from the filtered stream is input to a fitness tracking application. In other embodiments, the filter engine 206 stores the filtered signal stream in the storage device 243. In some other embodiments, the filter engine 206 sends the filtered signal stream to the activity identifier 208.

The activity identifier 208 can be software including routines for identifying activities. In some embodiments, the activity identifier 208 can be a set of instructions executable by the processor 235 to provide the functionality described below for identifying activities. In some embodiments, the activity identifier 208 can be stored in the memory 237 of the computing device 200 and can be accessible and executable by the processor 235. The activity identifier 208 may be adapted for cooperation and communication with the processor 235 and other components of the computing device 200 via signal line 236.

Example activities include, but are not limited to, physical activities (e.g., running, walking, sleeping, driving, talking to someone, biking, talking to a group, hiking, etc.), activities on social networks (e.g., playing online games on a social network, publishing posts and/or comments, acknowledging posts, sharing posts, etc.) and activities on user devices 115 (e.g., opening an application, listening to a playlist, calling a contact, writing emails, viewing photos, watching videos, etc.). Other example activities are possible.

In some embodiments, the activity identifier 208 receives a filtered signal stream from the filter engine 206, and identifies one or more activities from the filtered signal stream. For example, assume the filtered signal stream includes step data from a pedometer. The activity identifier 208 identifies that the user is walking if the frequency of steps conforms to the user's walking pace. However, if the frequency of steps conforms to the user's running pace, the activity identifier 208 identifies that the user is running In another example, the filtered signal stream includes (1) acceleration data indicating zero acceleration from an accelerometer, (2) timestamp data indicating the time is midnight from a GPS sensor, (3) brightness data indicating lights are off from a light detector, (4) power usage indicating that the user device 115 is connected to a charger, and (5) application usage indicating that the applications are not being used. The activity identifier 208 identifies that the user activity is sleeping based on the filtered signal stream.

In some embodiments, the activity identifier 208 determines user activities based on data received from multiple virtual detectors 202 and/or hardware sensors 252. For example, the filtered signal stream includes data indicating (1) a game application is running on the user device 115 and (2) the user is swiping fingers on the touch screen of the user device 115. The activity identifier 208 identifies that the user is playing a game on the user device 115. In another example, the filtered signal stream includes (1) data describing steps from a pedometer, (2) data describing that a music application is running on the user device 115 from the virtual detector 202, and (3) data describing a friend's mobile device is detected in proximity to the user device 115 from a Bluetooth sensor of the user device 115. The activity identifier 208 identifies that the user is listening to music and jogging with the friend based on the usage of the music application, the frequency of steps and presence of the friend's mobile device in proximity to the user device 115. In yet another example, the filtered signal stream includes (1) location data describing the user is currently in a coffee shop from a GPS sensor of the user device 115 and (2) data describing a friend's mobile device is detected in proximity to the user device 115 from a Bluetooth sensor of the user device 115. The activity identifier 208 identifies that the user is meeting with the friend at the coffee shop.

In some embodiments, the activity identifier 208 retrieves data describing a user profile from the social network server 101 with permission from the user. The user profile includes one or more of the user's age, gender, education background, working experience, interests, and other demographic information. The activity identifier 208 identifies one or more activities associated with the user from the filtered signal stream based on the user profile. For example, for a particular frequency of steps determined based on the step data from a pedometer, the activity identifier 208 may determine that the user is running if the user is a senior over 60 years old. However, the activity identifier 208 may determine that the user is walking at a fast pace if the user is a young athlete. In another example, if the user is categorized as a marathon running, the activity identifier 208 is more likely to identify the user activity as running than other activities such as biking, swimming, etc.

In some embodiments, the activity identifier 208 identifies a social aspect, an attention aspect and/or a mobility aspect for each activity based on the filtered signal stream. A social aspect indicates who is with the user during the activity. For example, a social aspect of a running activity indicates that a friend runs together with the user. In another example, a social aspect of a meeting indicates whether the user attends a business meeting or meets with friends. An attention aspect indicates what the user focuses on. For example, an attention aspect of a gaming activity indicates the user focuses his or her attention on the game application. A mobility aspect indicates a state of the user. For example, the mobility aspect indicates the user is sitting or moving during the activity. In some embodiments, the mobility aspect describes the user's geo-location. For example, the mobility aspect indicates the user is driving on a highway.

In some embodiments, the filtered signal stream includes change in actions, and the activity identifier 208 identifies a beginning and/or an ending of an activity from the filtered signal stream. For example, at a first timestamp, the activity identifier 208 identifies a beginning of a running activity if the filtered signal stream includes data indicating that the frequency of the user's steps increases from a walking pace to a running pace. At a second timestamp, the activity identifier 208 identifies an ending of the running activity if the filtered signal stream includes data indicating the frequency of the user's steps decreases from a running pace to a walking pace. In another example, at a first timestamp, the activity identifier 208 identifies a beginning of a dining activity if the filtered signal stream includes (1) location data indicating the user arrives at a restaurant and (2) data indicating presence of a friend's mobile device in proximity to the user's mobile device. At a second timestamp, the activity identifier 208 identifies an ending of the dining activity if the filtered signal stream includes location data indicating the user leaves the restaurant.

The aggregator 210 can be software including routines for aggregating activities associated with a user. In some embodiments, the aggregator 210 can be a set of instructions executable by the processor 235 to provide the functionality described below for aggregating activities associated with a user. In some embodiments, the aggregator 210 can be stored in the memory 237 of the computing device 200 and can be accessible and executable by the processor 235. The aggregator 210 may be adapted for cooperation and communication with the processor 235 and other components of the computing device 200 via signal line 238.

In some embodiments, the aggregator 210 aggregates one or more activities associated with a user to define an event related to the user. An event can be data describing a story of a user. In some embodiments, an event includes a single activity performed during a particular time period. For example, an exercise event describes that the user ran in a park from 6:00 AM to 6:30 AM. In some embodiments, an event includes multiple activities performed by a user during a particular time period. For example, a Saturday social event from 3:00 PM to 10:00 PM includes shopping with friends in a mall from 3:00 PM to 6:00 PM, dining with the friends in a restaurant from 6:00 PM to 8:00 PM and going to a movie with the friends from 8:00 PM to 10:00 PM.

In some embodiments, an event includes multiple activities related to a particular subject. For example, a gaming event includes playing a video game with a friend, posting a gaming result on a social network, sharing gaming photos online and posting comments on the gaming result. In some other embodiments, an event includes one or more activities performed at the same location. For example, a sports event includes watching a sports game with friends in a stadium, taking photos of the sports game, shopping for a jersey in the stadium, and encountering a colleague in the stadium, etc. Other example events are possible. In some embodiments, the aggregator 210 stores the events defined from activities of a user in the data storage 243. In other embodiments, the aggregator 210 sends the events to the summarizing engine 212.

The summarizing engine 212 can be software including routines for generating detailed summaries of events for a first user depending on a type of relationship between the first user and a second user. In some embodiments, the summarizing engine 212 can be a set of instructions executable by the processor 235 to provide the functionality described below for generating graphical data for generating summaries. In some embodiments, the summarizing engine 212 can be stored in the memory 237 of the computing device 200 and can be accessible and executable by the processor 235. The summarizing engine 212 may be adapted for cooperation and communication with the processor 235 and other components of the computing device 200 via signal line 240.

In some embodiments, the summarizing engine 212 receives events including activities of a first user from the aggregator 210 and generates a summary of the first user's activities based on the events. In some embodiments, the activities include activities within a certain time period. In some embodiments, the activities may include activities during a first user's life during a period or periods of time between interactions of the first user and a second user. For example, the summarizing engine 212 receives events of the first user's physical activities, activities on social networks and activities on user devices 115 from the aggregator 210 and generates a summary of the first user's activities. In some embodiments, the summarizing engine 212 generates a summary of the first user's activities during a specified time period (e.g., a day, a week or a month). For example, the summarizing engine 212 generates a summary of applications used by the first user, posts published by the first user, people meeting with the first user, photos shared by the first user, videos viewed by the first user, and other physical activities (e.g., biking, walking etc.) performed by the first user during the specified time period. For example, the summarizing engine 212 may generate a summary of activities during a user's lifetime. For example, the summarizing engine 212 may summarize or identify important moments in the lifetime of a first user during the person of time between interactions between the first user and another user.

In some embodiments, the summarizing engine 212 determines that the first user is within proximity to a second user, generates a summary of the first user's activities based on the first user's closeness with the second user and provides the first user with the summary. In some embodiments, the proximity is a physical proximity between the first and second users. The summarizing engine 212 determines that the first user is within proximity to the second user based on data received from multiple virtual detectors 202 and/or hardware sensors 252. For example, the summarizing engine 212 determines that the first user is within proximity to the second user based on data describing that the second user's mobile device is detected in proximity to the user device 115 associated with the first user from a Bluetooth sensor of the user device 115, or based on location data describing both the first user and the second user are currently in a coffee shop from GPS sensors of the user devices 115 associated with the first user and the second user.

In some embodiments, the summarizing engine 212 determines the first user's closeness with the second user based on a connection between the first user and the second user. In some embodiments, the connection is a social connection between the first user and the second user on a social network. For example, the summarizing engine 212 receives social data (e.g., profiles, relationships, a social graph, etc.) from one or more social networks and determines if and how users are connected. In some embodiments, the summarizing engine 212 determines the first user's closeness with the second user based on a degree of separation of a social connection between the first user and the second user. For example, the summarizing engine 212 identifies that the first and second users follow each other in a social network and determines a degree of separation of one between the first and second users. Based on this first-degree separation, the summarizing engine 212 determines that the first user and second user are close. The lower the degree of separation is, the closer the first and second users are. For example, the summarizing engine 212 determines that there is a first-degree friendship connection between the first and second users since they are directly connected in a social network with a friendship connection. The summarizing engine 212 also determines that there is a second-degree friendship connection between the first user and a third user since they are connected in the social network via a mutual friend. The summarizing engine 212 determines that the first user is closer to the second user than to the third user based on comparing the degrees of separation.

In other embodiments, the summarizing engine 212 determines a connection between the first and second users based on other sources. For example, besides the social network connection on a social network described above, the sources for the connection between the first and second users can also include communications, such as emails, micro-blogs, blogs, forums, user contact lists, corporate employee databases, organizational charts, etc. As another example, the sources for connection between the first and second users can also be historical co-presence of the first and second users. For example, the summarizing engine 212 can determine if users are connected by checking users' contact lists or by determining if users have sent or received a certain number of emails (e.g., one email, 5 emails, 10 emails, 50 emails, etc.) to or from each other in a certain period of time (e.g., in a week, in a month, in a year, etc.). In another example, the summarizing engine 212 can determine user connections by analyzing corporate employee databases or school alumni databases, etc. For example, the summarizing engine 212 determines that users are connected if they have worked for the same employer or if they have studied at the same school.

In some embodiments, the summarizing engine 212 determines the first user's closeness with the second user based on the first and second users' connection from other sources. For example, if the first user frequently exchanges emails with the second user (e.g., ten emails per week) while seldom communicating with a third user via emails (e.g., two emails per month), the summarizing engine 212 determines that the first user is closer to the second user than to the third user. If the first user met a fourth user once when they attended the same conference one year ago, the summarizing engine 212 determines that the first user is closer to the third user than to the fourth user.

In some embodiments, the summarizing engine 212 determines that the first user's closeness with the second user based on a time elapsed since a last interaction. In some embodiments, the summarizing engine 212 determines which events to include in the summary based on a time elapsed since a last interaction. The summarizing engine 212 receives activity data from the activity identifier 208 and determines a time elapsed since a last interaction between the first and second users based on the activity data. For example, the time elapsed may be time elapsed since the last face-to-face meeting between the first and second users, or since the last communication between the first and second users, or some other last interaction between the first and second users. The summarizing engine 212 increases the closeness between the first and second users when the determined time is reduced. For example, the summarizing engine 212 determines that the first user and the second user are close based on an activity that the first user commented on a post sent by the second user 15 minutes ago. The summarizing engine 212 determines that the first user is distant to a third user since the last interaction between them was that the third user replied an email from the first user two years ago.

In some embodiments, the summarizing engine 212 determines that the first user's closeness with the second user based on at least one of a connection between the first user and the second user and a time elapsed since a last interaction. For example, the summarizing engine 212 determines that the first and second users are close since they are directly connected with a friendship connection on a social network (e.g., a degree of separation of one). However, if the summarizing engine 212 also determines that the last interaction between the first and second users (e.g., an email) occurred one year ago, the summarizing engine 212 decreases the closeness between the first and second users.

The summarizing engine 212 determines relationships between the first and second users based on the closeness. In some embodiments, the summarizing engine 212 classifies the first user's relationship with the second user as being a first type of relationship, a second type of relationship or a third type of relationship. If the first user knows the second user very well (e.g., close friends and/or interact with each other frequently), the summarizing engine 212 classifies the relationship between the first and second users as being a first type of relationship. If the first user does not know the second user very well (e.g., acquaintances and/or interact with each other infrequently), the summarizing engine 212 classifies the relationship between the first and second users as being a second type of relationship. If the first user has not met the second user in person (e.g., strangers with information shared in common), the summarizing engine 212 classifies the relationship between the first and second users as being a third type of relationship.

In some embodiments, the summarizing engine 212 determines relationships between the first and second users based on various contexts. For example, in some embodiments, the summarizing engine 212 classifies the first user's relationship with the second user based on the context of the relationship. For example, the first and second users may have a personal relationship. As another example, the first and second users may have a professional relationship.

In some embodiments, the summarizing engine 212 determines relationships between the first and second users based on historical context. For example, if the first user and the second user were on the same sports team, the relationship may be categorized based on that. As another example, if the first user and the second user were in the same club, the relationship may be categorized based on that.

In some embodiments, the summarizing engine 212 assigns threshold degrees of separation and determines whether the first user knows the second user well based on the threshold degrees of separation. For example, the summarizing engine 212 assigns a first threshold degree of separation as two and assigns a second threshold degree of separation as seven. If the degree of separation of a connection between the first and second users is less than two, the summarizing engine 212 determines that the first user knows the second user very well and they have a first type of relationship. If the degree of separation of a connection between the first and second users is between two and seven, the summarizing engine 212 determines that the first user generally knows the second user (e.g., they are on edge of a social graph) and they have a second type of relationship. If the degree of separation of a connection between the first and second users is greater than seven, the summarizing engine 212 considers that the first and second users are strangers and determines that they have a third type of relationship.

In other embodiments, the summarizing engine 212 uses other factors (e.g., interaction frequency, a time elapsed since a last interaction, etc.) to determine whether the first user knows the second user very well. For example, if the summarizing engine 212 determines that the first and second users interact with each other on a social network about twice per month or determines that the last interaction between the first and second users was 20 days ago, the summarizing engine 212 determines that the first user does not know the second user very well and classifies the relationship between the first and second users as being a second type of relationship.

Responsive to having the first type of relationship, the summarizing engine 212 generates a first summary for the first user that includes a notification that the second user is nearby, a last interaction with the second user and recent interactions with the second user. In particular, the first summary includes any action items that the first user owes the second user. For example, the summarizing engine 212 includes a notification "dinner with your friend" and restaurant information in the first summary to remind the first user that he/she needs to make dinner plans with the second user. In another example, the summarizing engine 212 attaches a starred email in the first summary to remind the first user that he/she needs to give a class notes mentioned in the starred email to the second user. The first summary will be described in detail below with reference to FIG. 3A.

Responsive to having the second type of relationship, the summarizing engine 212 generates a second summary for the first user that includes the notification that the second user is nearby, the last interaction with the second user and events that the first user and the second user share in common. Examples of social events that the first user and the second user share in common may be photos of the two users together, events that both users attended, and stories related to both users. Other examples of events that the first user and the second user share in common may be events that happened specifically in this location where the two users are currently located. In some embodiments, the second summary includes important events that occurred to the first user that the second user might be interested in hearing about. For example, after the first and second user last met in an information technology (IT) conference, the first user started up an IT company. The summarizing engine 212 includes the information of the first user's IT company in the second summary. In other embodiments, the second summary also includes a name of a mutual connection and an event that the mutual connection attended. For example, in the above example, the summarizing engine 212 also includes the IT conference that both the first user and the second user attended last year in the second summary to remind the first user of the second user. In another example, the summarizing engine 212 includes a name of a university from which the first and second users graduated or a mutual friend's name in the second summary. In yet another example, the summarizing engine 212 includes a common hobby or common acquaintances between the first a second users. In yet other embodiments, the second summary includes a recent post on a social network that was created by the second user. For example, the second summary includes a picture of a restaurant near the Golden Gate Bridge taken by the second user on the first day the second user arrived in San Francisco where the first user lives. From this picture, the first user can get a talking point for conversing with the second user by receiving information about which kind of restaurants the second user likes and which kind of places the second user wants to visit. As a result, the connection between the first and second users may be enhanced. The second summary will be described in detail below with reference to FIGS. 3B and 3C.

Responsive to having the third type of relationship, the summarizing engine 212 generates a third summary for the first user that includes the notification that the second user is nearby and events that the first user and the second user share in common. For example, the summarizing engine 212 includes biographical information that the first user and the second user share in common such as having worked in a same company, or joining a New Year's celebration every year at Times Square in New York City. The third summary will be described in detail below with reference to FIG. 3D.

Once the summarizing engine 212 determines that the first user is within proximity to the second user, the summarizing engine 212 generates a summary based on the type of relationship between the first and second users and provides the first user with the summary. The summary includes a notification that the second user is nearby, a last time the first user interacted with the second user and information about at least one of the first user and the second user. In some embodiments, the summarizing engine 212 determines that the first user is within proximity to the second user, for example, when the first and second users are face-to-face or close enough in proximity that they are in a conversation with each other. In some embodiments, the notification may include that another user is a certain distance away. In other embodiments, the notification could prompt the two users to coordinate online or start heading toward one another in order to meet.

The user interface engine 214 can be software including routines for generating graphical or audio data for providing user interfaces to users. In some embodiments, the user interface engine 214 can be a set of instructions executable by the processor 235 to provide the functionality described below for generating graphical data for providing user interfaces to users or providing audio data to users. In some embodiments, the user interface engine 214 can be stored in the memory 237 of the computing device 200 and can be accessible and executable by the processor 235. The user interface engine 214 may be adapted for cooperation and communication with the processor 235 and other components of the computing device 200 via signal line 242.

In some embodiments, the user interface engine 214 generates graphical data for providing a user interface that depicts a summary of a user's activities. The user interface engine 214 sends the graphical data to a user device 115, causing the user device 115 to present the user interface to the user. In some embodiments, the user interface engine 214 may help trigger launching of a relevant application and relevant content with the applications (for example, an email application might have the right email open or the result of a query for related emails between the first and second users). Example user interfaces are shown in FIGS. 3A-3D. In other embodiments, the user interface engine 214 generates graphical data for providing a user interface that depicts an event associated with one or more users. A user may modify or update the event notification, add more peers to the event, share the event, add a detailed description of photos, make comments on the event, add or update a title for the event, or perform other actions on the event using the user interface. The user interface engine 214 may generate graphical data for providing other user interfaces to users.

The privacy engine 216 can be software including routines for determining what information to provide to a user based on privacy settings. In some embodiments, the privacy engine 216 can be a set of instructions executable by the processor 235 to provide the functionality described below for determining what information to provide to a user based on privacy settings, the privacy engine 216 can be stored in the memory 237 of the computing device 200 and can be accessible and executable by the processor 235. The privacy engine 216 may be adapted for cooperation and communication with the processor 235 and other components of the computing device 200 via signal line 217.

In some embodiments, the privacy engine 216 determines privacy settings from a user profile associated with a user. For example, John manually selects privacy settings such as preferring to share personal photos with a group in the social network that he created called "close friends." The privacy engine 216 communicates with the summarizing engine 212 to determine what information to provide to a user based on privacy settings. For example, in the above example, when John is nearby his best friend Linda and his acquaintance Sara, the summary engine 212 generates a first summary for Linda that includes a personal photo of John and generates a second summary for Sara without including the personal photo. As another example, the summary engine 212 may also generate a third summary of the common items for all three users of all of the three users together (for example, email threads between all three users, documents that all three users collaborated on, or shared photos among the three users, etc.).

Figure 3A:
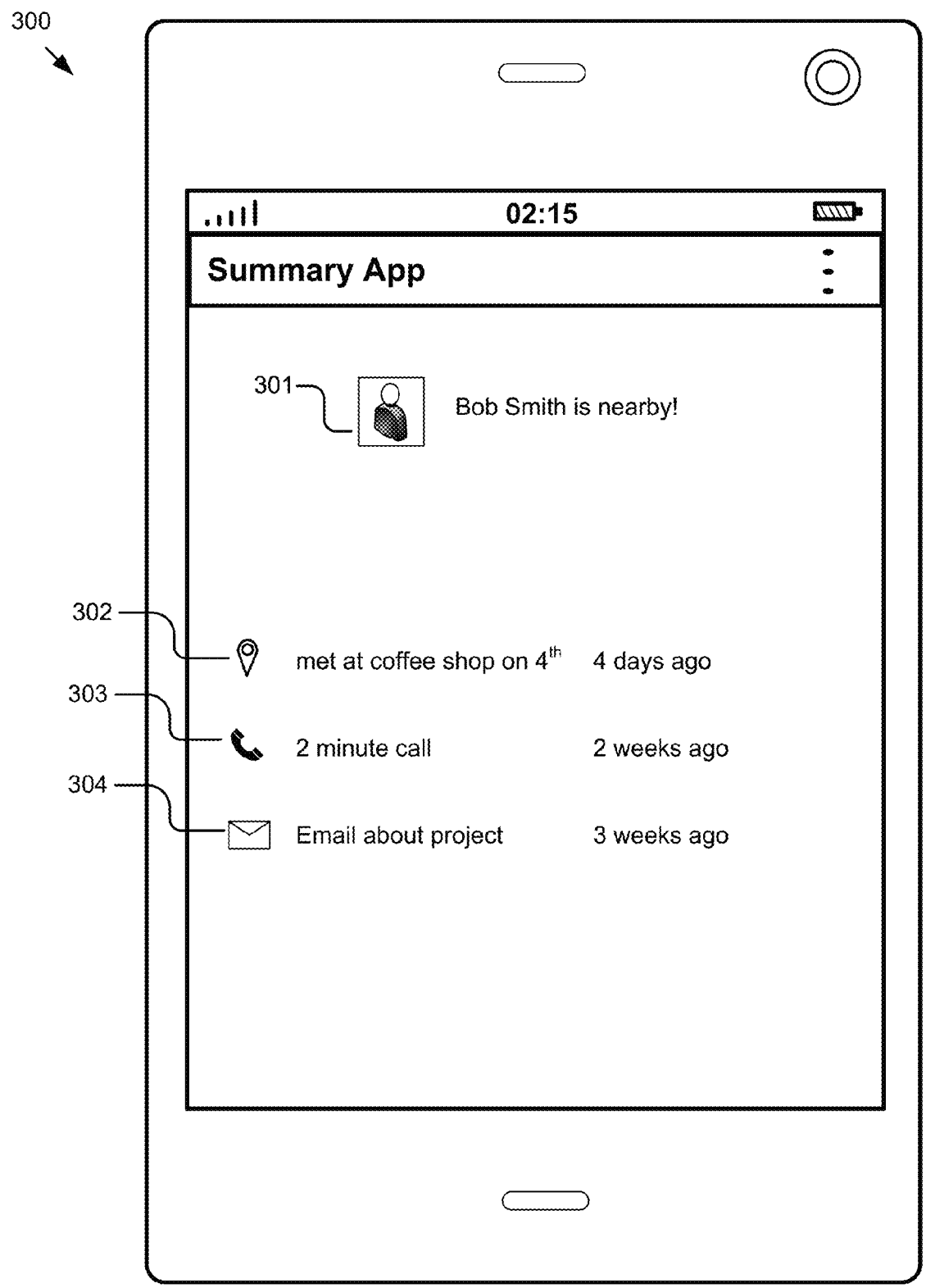
FIG. 3A is an example graphic representation of a user interface for displaying a summary where the first user and the second user are close friends and/or interact with each other frequently.

FIG. 3A is an example graphic representation of a user interface 300 for displaying a summary where the first user and the second user are close friends and/or interact with each other frequently. The user interface 300 displays a summary generated for Lance. The user interface 300 includes a notification 301 notifying Lance that Bob Smith is nearby. Bob is a close friend of Lance. Four days ago they met with each other at a coffee shop. The user interface 300 includes this last interaction at 302. Besides this interaction, the user interface 300 also includes other interactions between Bob and Lance, for example, the indication 303 shows that Bob and Lance had a two-minute call two weeks ago and the indication 304 shows that Bob and Lance exchanged an email about a project three weeks ago. Using the indication 304, Lance may be reminded that he owns some documents related to the project to Bob.

Figure 3B:
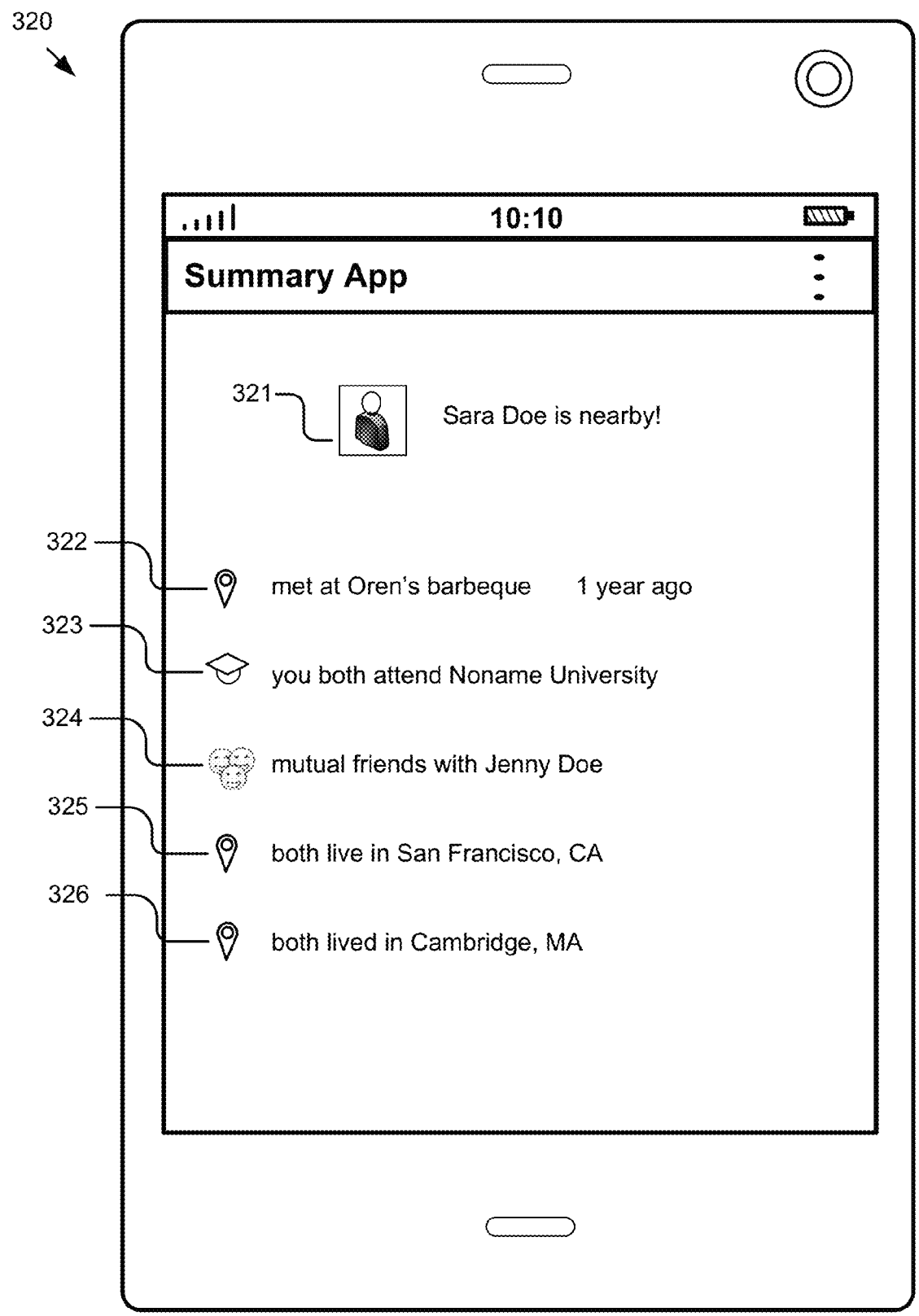
FIGS. 3B and 3C are example graphic representation of user interfaces for displaying a summary where the first user and the second user are friends and/or interact with each other infrequently.
Figure 3C:
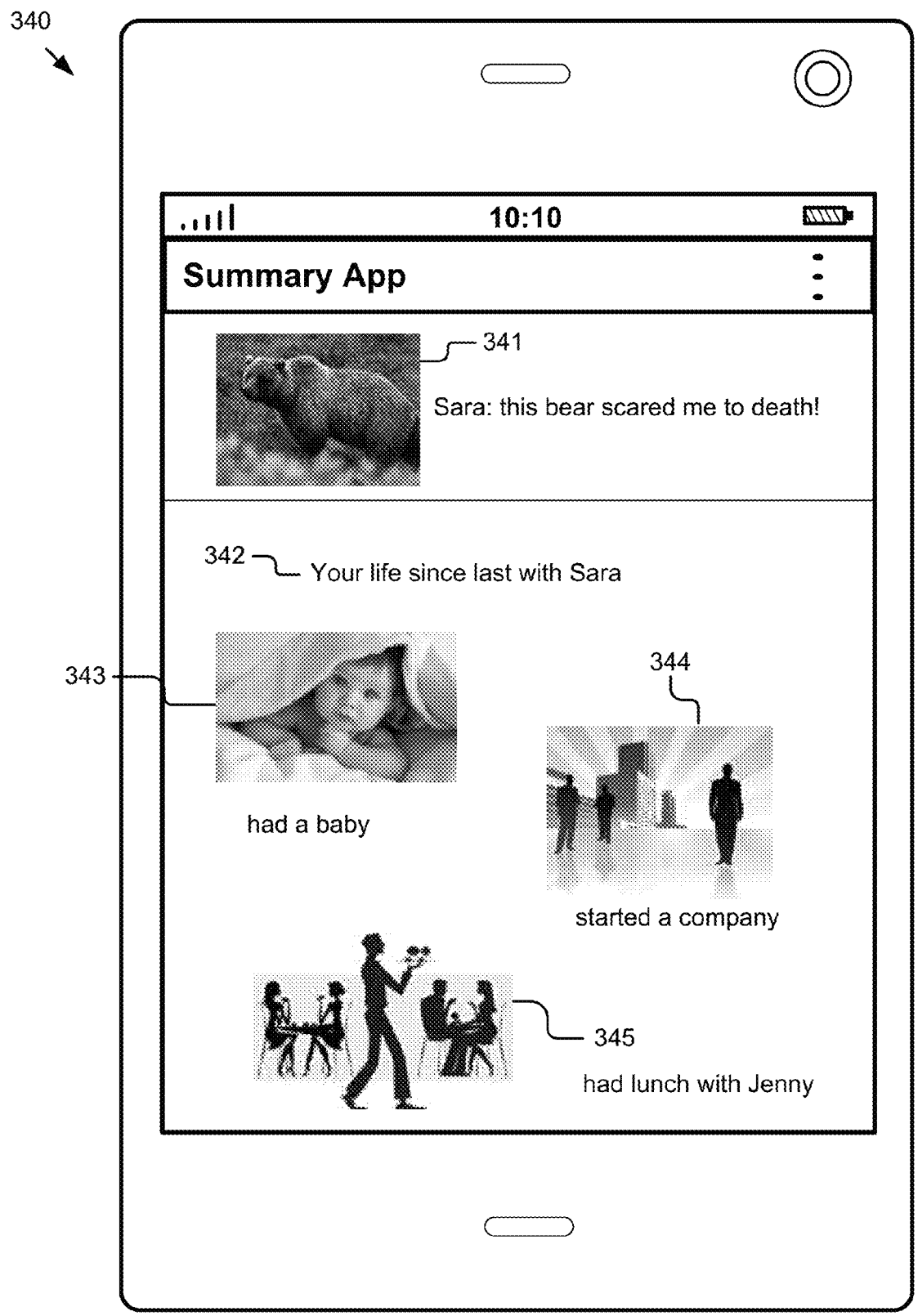

FIGS. 3B and 3C are example graphic representations of user interfaces 320 and 340 for displaying a summary where the first user and the second user are friends and/or interact with each other infrequently. The user interfaces 320 and 340 display a first portion and a second portion of a summary generated for Lance. In FIG. 3B, the user interface 320 includes a notification 321 notifying Lance that Sara Doe is nearby. Sara is a friend of Lance. Last time they met with each other was at Oren's Barbeque one year ago. The user interface 320 includes this last interaction at 322. The user interface 320 also includes events that Sara and Lance share in common, for example, the indication 323 shows that Sara and Lance both attended Noname University, the indication 324 shows that Sara and Lance are both friends of John Doe, the indication 325 shows that Sara and Lance both live in San Francisco, Calif. and the indication 326 shows that Sara and Lance used to live in Cambridge, Mass.

Referring now to FIG. 3C, the user interface 340 displays a second portion of the summary generated for Lance. The user interface 340 includes a recent post 341 on a social network that was created by Sara. The picture 341 taken by Sara shows how Sara was scared by a bear when the bear was too close to her. The user interface 340 also includes important events that occurred to Lance that Sara might be interested in hearing about, e.g., Lance's life since last communicating with Sara 342. For example, the picture 343 shows that Lance had a baby, the picture 344 shows that Lance started a company and the picture 345 shows that Lance had lunch with their mutual friend Jenny.

Figure 3D:
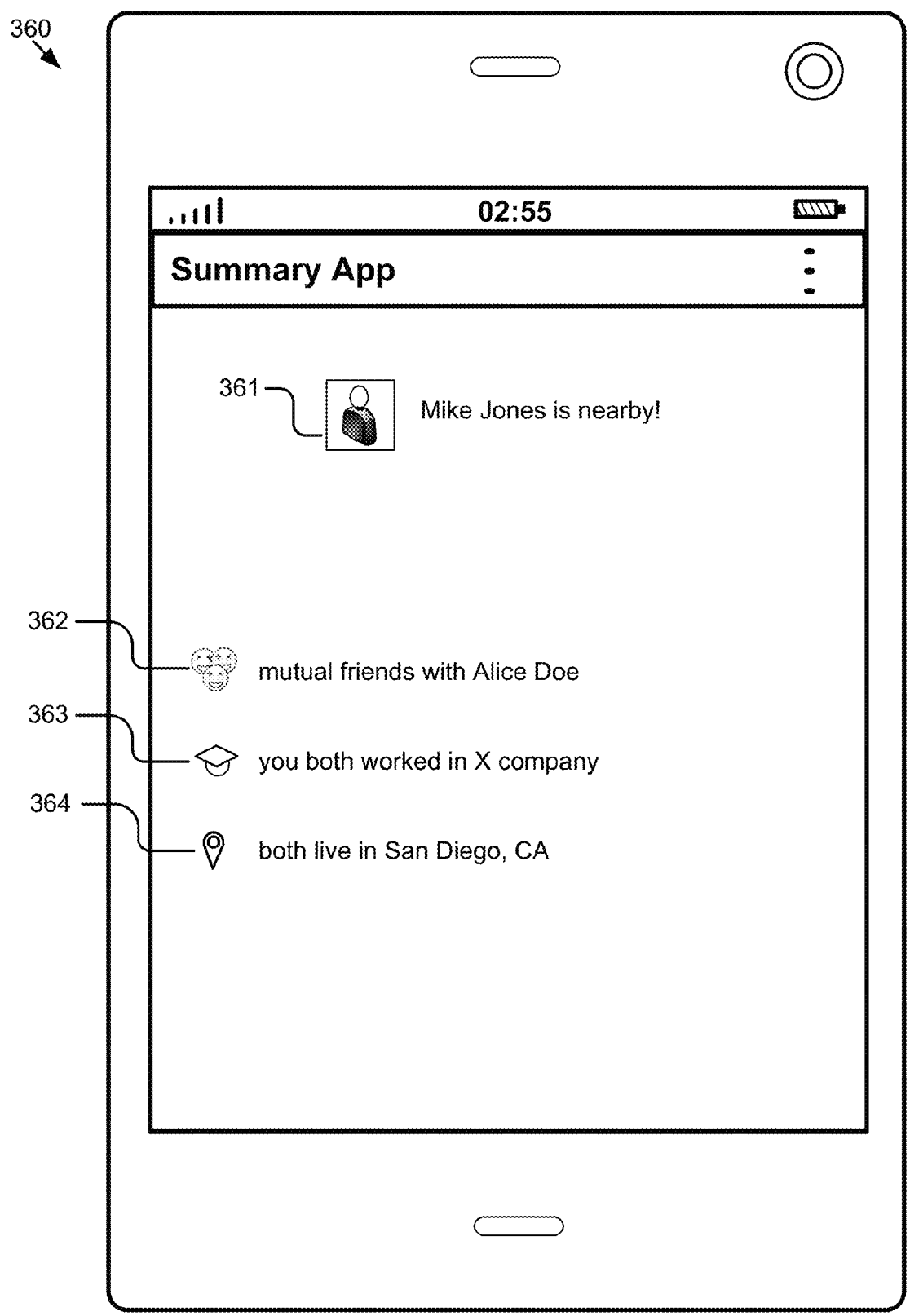
FIG. 3D is an example graphic representation of a user interface for displaying a summary where the first user and the second user are strangers with information shared in common.

FIG. 3D is an example graphic representation of a user interface 360 for displaying a summary where the first user and the second user are strangers with information shared in common. The user interface 360 displays a summary generated for Lance. The user interface 360 includes a notification 361 notifying Lance that Mike Jones is nearby. Lance does not really know Mike but shares common information with Mike. For example, the indications 362, 363 and 364 show that both Lance and Mike are friends of Alice Doe, used to work in X company and currently live in San Diego, Calif. By providing the common information shared between Lance and Mike, they have some topics to discuss and may eventually know each other well.

Figure 4:
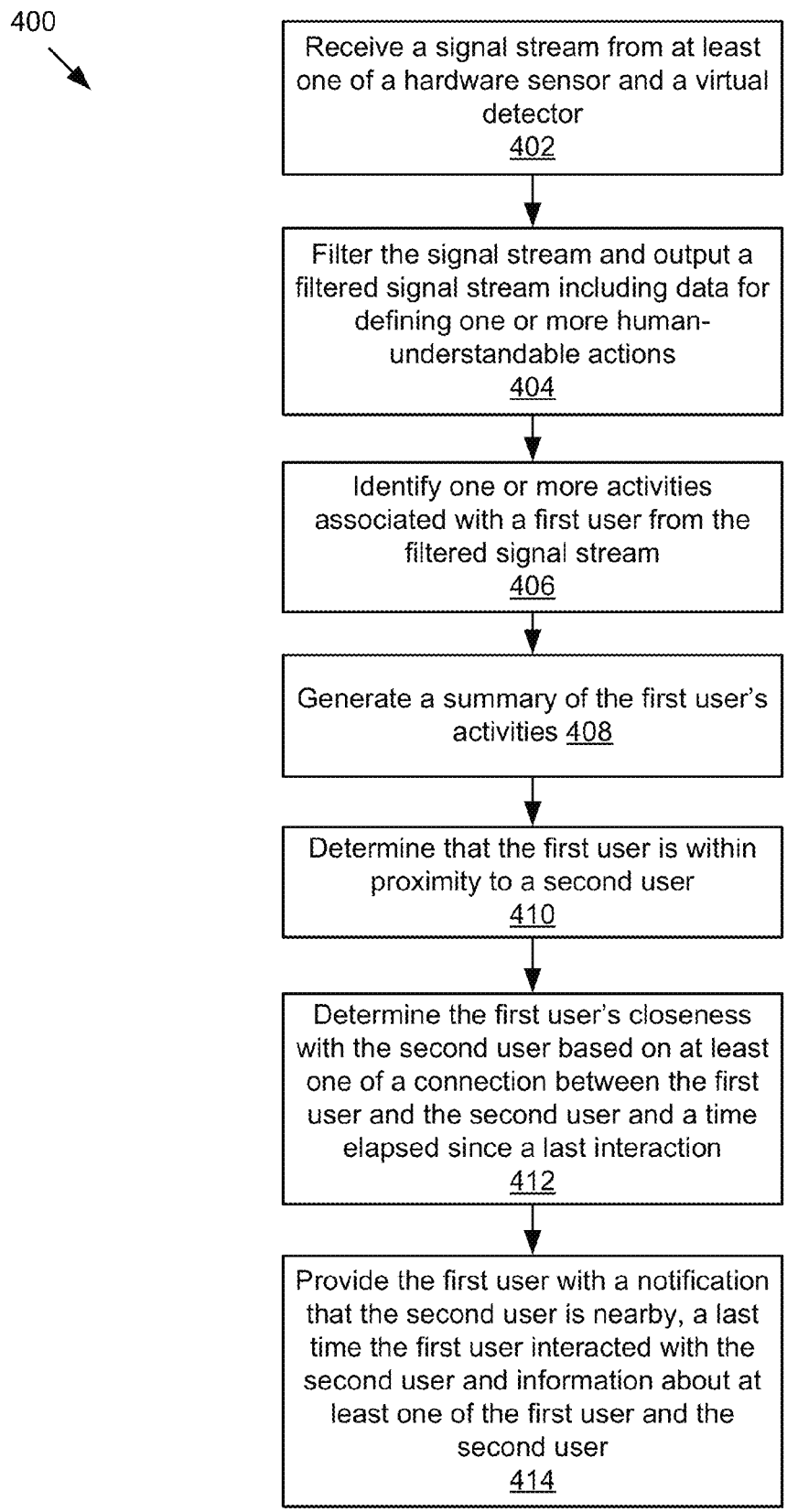
FIG. 4 is a flow diagram of an example of a method for generating a summary for a first user.

FIG. 4 is a flow diagram of an example of a method for generating a summary for a first user. In some embodiments, the summary application 103 comprises a processing unit 204, a filter engine 206, an activity identifier 208, and a summarizing engine 212. The processing unit 204 receives 402 a signal stream from at least one of a hardware sensor 252 and a virtual detector 202. The filter engine 206 filters 404 the signal stream and outputs a filtered signal stream including data for defining one or more human-understandable actions. The activity identifier 208 identifies 406 one or more activities associated with a first user from the filtered signal stream. The summarizing engine 212 generates 408 a summary of the first user's activities. The summarizing engine 212 determines 410 that the first user is within proximity to a second user. The summarizing engine 212 determines 412 the first user's closeness with the second user based on at least one of a connection between the first user and the second user and a time elapsed since a last interaction. The summarizing engine 212 provides 414 the first user with a notification that the second user is nearby, a last time the first user interacted with the second user and information about at least one of the first user and the second user.

Figure 5A:
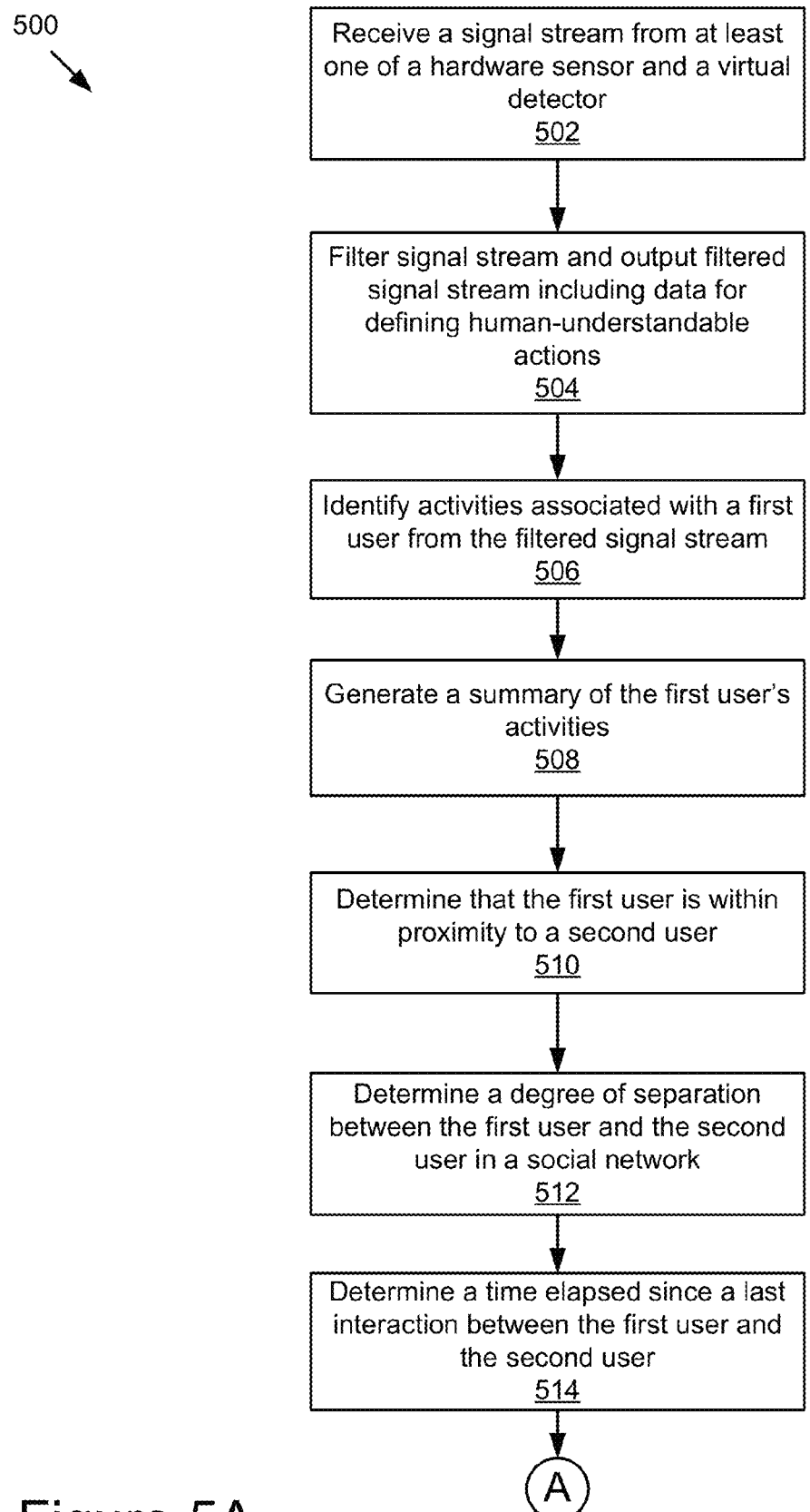
FIGS. 5A and 5B are flow diagrams of another example of a method for generating a summary for a first user depending on the type of relationship between the users.
Figure 5B:
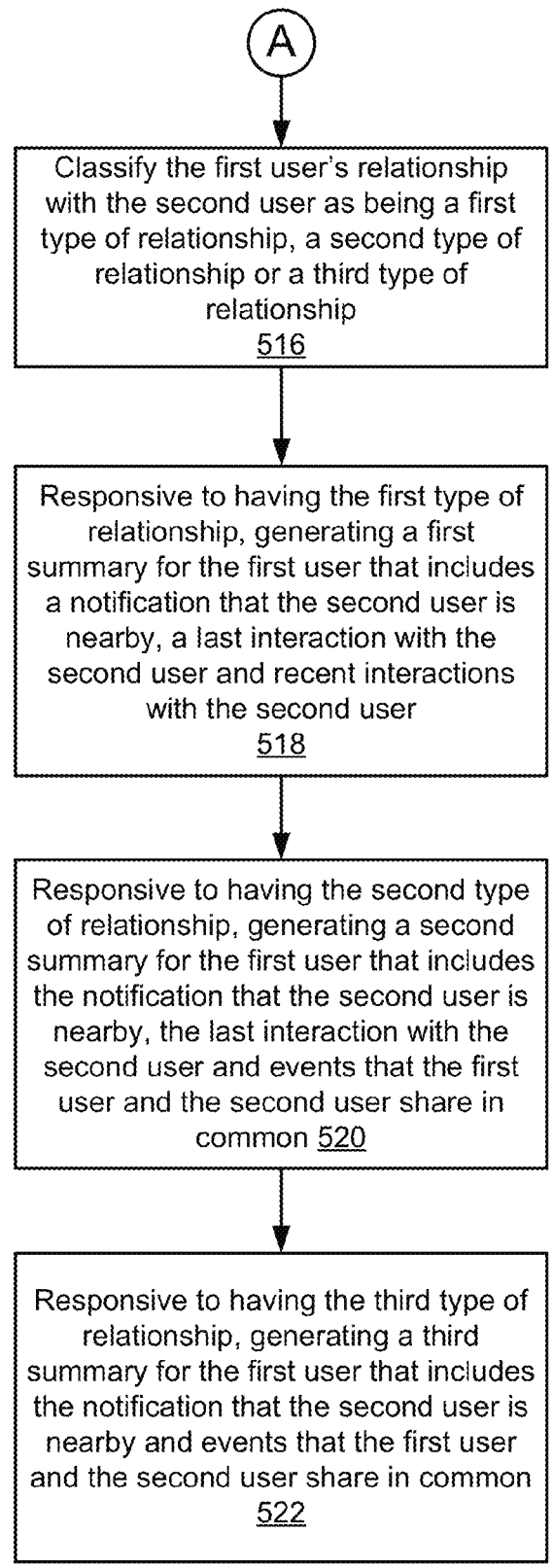

FIGS. 5A and 5B are flow diagrams of another example of a method for generating a summary for a first user depending on the type of relationship between the users. In some embodiments, the summary application 103 comprises a processing unit 204, a filter engine 206, an activity identifier 208, an aggregator 210, and a summarizing engine 212. In FIG. 5A, the processing unit 204 receives 502 a signal stream from at least one of a hardware sensor 252 and a virtual detector 202. The signal stream includes at least one of hardware raw data generated by the hardware sensor 252 and virtual raw data generated by the virtual detector 202. The filter engine 206 filters 504 the signal stream and outputs a filtered signal stream including data for defining one or more human-understandable actions. For example, the filter engine 206 outputs a filtered signal stream that combines one or more of the following data including: (1) location and velocity data from a GPS sensor, and (2) detection data indicating presence of an automobile (e.g., Bluetooth enabled) and a mobile in close proximity, etc. to indicate travelling together with another user.

The activity identifier 208 identifies 506 one or more activities associated with a first user from the filtered signal stream. For example, for a particular frequency of steps determined based on the step data from a pedometer, the activity identifier 208 may determine that the user is running if the user is a senior over 60 years old. However, the activity identifier 208 may determine that the user is walking at a fast pace if the user is a young athlete. In another example, if the user is categorized as a marathon runner, the activity identifier 208 is more likely to identify the user activity as running than other activities such as biking, swimming, etc.

The summarizing engine 212 generates 508 a summary of the first user's activities. In some embodiments, the summarizing engine 212 receives events including activities of a first user from the aggregator 210 and generates a summary of the first user's activities based on the events. The summarizing engine 212 determines 510 that the first user is within proximity to a second user. For example, the summarizing engine 212 determines that the first user is within proximity to the second user based on data describing that the second user's mobile device is detected in proximity to the user device 115 associated with the first user from a Bluetooth sensor of the user device 115.

The summarizing engine 212 determines 512 a degree of separation between the first user and the second user in a social network. For example, the summarizing engine 212 identifies that the first and second users follow each other in a social network and determines a degree of separation of one between the first and second users. In this example, based on this first-degree separation, the summarizing engine 212 determines that the first user and second user are close.

The summarizing engine 212 determines 514 a time elapsed since a last interaction between the first user and the second user. For example, the summarizing engine 212 determines that the first user and the second user are close based on an activity that the first user commented on a post sent by the second user 15 minutes ago. The summarizing engine 212 determines that the first user is distant to a third user since the last interaction between them was when the third user replied an email from the first user two years ago. In some embodiments, the summarizing engine 212 determines 514 a time elapsed since a last interaction between the first user and the second user to determine relevant events to include.

Referring now to FIG. 5B, the summarizing engine 212 classifies 516 the first user's relationship with the second user as being a first type of relationship, a second type of relationship or a third type of relationship. If the first user knows the second user very well (e.g., close friends and/or interact with each other frequently), the summarizing engine 212 classifies the relationship between the first and second users as being a first type of relationship. If the first user does not know the second user very well (e.g., acquaintances and/or interact with each other infrequently), the summarizing engine 212 classifies the relationship between the first and second users as being a second type of relationship. If the first user has not met the second user in person (e.g., strangers with information shared in common), the summarizing engine 212 classifies the relationship between the first and second users as being a third type of relationship.

Responsive to having the first type of relationship, the summarizing engine 212 generates 518 a first summary for the first user that includes a notification that the second user is nearby, a last interaction with the second user and recent interactions with the second user. For example, the summarizing engine 212 includes a notification "dinner with your friend" and restaurant information in the first summary to remind the first user that he/she owns a dinner to the second user.

Responsive to having the second type of relationship, the summarizing engine 212 generates 520 a second summary for the first user that includes the notification that the second user is nearby, the last interaction with the second user and events that the first user and the second user share in common. In some embodiments, the second summary includes important events that occurred to the first user that the second user might be interested in hearing about. In other embodiments, the second summary also includes a name of a mutual connection and an event that the mutual connection attended. In yet other embodiments, the second summary includes a recent post on a social network that was created by the second user.

Responsive to having the third type of relationship, the summarizing engine 212 generates 522 a third summary for the first user that includes the notification that the second user is nearby and events that the first user and the second user share in common. For example, the summarizing engine 212 includes biographical information that the first user and the second user share in common such as having worked in a same company, or joining New Year's celebration every year at Times Square in New York City.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic disks; read-only memories (ROMs); random access memories (RAMs); EPROMs; EEPROMs; magnetic or optical cards; flash memories including USB keys with non-volatile memory; or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more hardware processors, a signal stream from at least one of a hardware sensor and a virtual detector;
filtering, with the one or more hardware processors, the signal stream and outputting filtered signal stream including data defining human-understandable actions;
identifying activities associated with a first user from the filtered signal stream;
summarizing the first user's activities;
determining that the first user is within proximity to a second user if a distance between the first user and the second user is shorter than a predetermined distance;
determining a degree of separation between the first user and the second user in a social network;
determining a time elapsed since a last interaction between the first user and the second user;
classifying the first user's relationship with the second user as being a first type of relationship, a second type of relationship or a third type of relationship;
responsive to having the first type of relationship, generating a first summary for the first user that includes a notification that the second user is nearby, a last interaction with the second user and recent interactions with the second user;
responsive to having the second type of relationship, generating a second summary for the first user that includes the notification that the second user is nearby, the last interaction with the second user and events that the first user and the second user share in common; and
responsive to having the third type of relationship, generating a third summary for the first user that includes the notification that the second user is nearby and events that the first user and the second user share in common.

2. The method of claim 1, wherein the first, second and third summaries include action items that the first user owes the second user.

3. The method of claim 1, wherein the first, second and third summaries include important events that occurred to the first user that the second user might be interested in hearing about.

4. The method of claim 1, wherein the first, second and third summaries include a name of a mutual connection and an event that the mutual connection attended.

5. The method of claim 1, wherein the first, second and third summaries include a recent post on a social network that was created by the second user.

6. The method of claim 1, wherein the first user and the second user have not met and the information about the last time the first user interacted with the second user is a shared event that they attended.

7. The method of claim 1, further comprising determining what information to provide in the summary to the first user about the second user based on privacy settings.

8. The method of claim 1, wherein determining that the first user is within proximity to the second user is based at least in part on data received from at least one of the hardware sensor and the virtual detector.

9. A system comprising:
one or more hardware processors;
a processing unit stored on a memory and executable by the one or more hardware processors, the processing unit configured to receive a signal stream from at least one of a hardware sensor and a virtual detector;
a filter engine coupled to the processing unit and configured to filter the signal stream and outputting filtered signal stream including data defining human-understandable actions;
an activity identifier coupled to the filter engine and configured to identify activities associated with a first user from the filtered signal stream; and
a summary engine coupled to the activity identifier and configured to: summarize the first user's activities, determine that the first user is within proximity to a second user if a distance between the first user and the second user is shorter than a predetermined distance, determine a degree of separation between the first user and the second user in a social network and a time elapsed since a last interaction, classify the first user's relationship with the second user as being a first type of relationship, a second type of relationship or a third type of relationship; responsive to having the first type of relationship, generate a first summary for the first user that includes a notification that the second user is nearby, a last interaction with the second user and recent interactions with the second user; responsive to having the second type of relationship, generate a second summary for the first user that includes the notification that the second user is nearby, the last interaction with the second user and events that the first user and the second user share in common; and responsive to having the third type of relationship, generate a third summary for the first user that includes the notification that the second user is nearby and events that the first user and the second user share in common.

10. The system of claim 9, wherein the first, second and third summaries include action items that the first user owes the second user.

11. The system of claim 9, wherein the first, second and third summaries include important events that occurred to the first user that the second user might be interested in hearing about.

12. The system of claim 9, wherein the first, second and third summaries include a name of a mutual connection and an event that the mutual connection attended.

13. The system of claim 9, wherein the first, second and third summaries include a recent post on a social network that was created by the second user.

14. The system of claim 9, wherein the first user and the second user have not met and the information about the last time the first user interacted with the second user is a shared event that they attended.

15. The system of claim 9, further comprising a privacy engine coupled to the summary engine, the privacy engine configured to determine what information to provide in the summary to the first user about the second user based on privacy settings.

16. The system of claim 9, wherein determining that the first user is within proximity to the second user is based at least in part on data received from at least one of the hardware sensor and the virtual detector.

* * * * *